United States Patent
Park et al.

(10) Patent No.: US 7,420,531 B2
(45) Date of Patent: Sep. 2, 2008

(54) LIQUID CRYSTAL DISPLAY DEVICE AND METHOD OF DRIVING THE SAME

(75) Inventors: Ki-Bok Park, Gyeonggi-do (KR); Won-Ho Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 590 days.

(21) Appl. No.: 11/016,738

(22) Filed: Dec. 21, 2004

(65) Prior Publication Data
US 2005/0134782 A1 Jun. 23, 2005

(30) Foreign Application Priority Data
Dec. 22, 2003 (KR) ...................... 10-2003-0094988

(51) Int. Cl.
*G09G 3/36* (2006.01)
(52) U.S. Cl. .............................. 345/87; 345/89; 345/98; 345/100; 345/102; 345/211; 345/690; 345/693; 349/42; 349/44
(58) Field of Classification Search .................. 345/87, 345/88, 89, 92, 94, 95, 98, 100, 204, 690, 345/102
See application file for complete search history.

(56) References Cited
U.S. PATENT DOCUMENTS

| | | | | |
|---|---|---|---|---|
| 6,331,844 B1 * | 12/2001 | Okumura et al. | .............. | 345/87 |
| 6,452,589 B1 * | 9/2002 | McKnight | .................... | 345/205 |
| 6,771,247 B2 * | 8/2004 | Sato et al. | ...................... | 345/98 |
| 6,778,162 B2 * | 8/2004 | Kimura et al. | ................ | 345/90 |
| 7,053,876 B2 * | 5/2006 | Kimura et al. | ................ | 345/98 |

* cited by examiner

*Primary Examiner*—Richard Hjerpe
*Assistant Examiner*—Jennifer T Nguyen
(74) *Attorney, Agent, or Firm*—McKenna Long & Aldridge LLP (57) ABSTRACT

A liquid crystal display device includes a plurality of data lines disposed in a first direction on a substrate; a plurality of gate lines disposed in a second direction on the substrate, a plurality of pixels defined by intersections of the gate and data lines in a matrix; a plurality of control lines disposed parallel to the gate lines; a controlling unit supplying a control signal to the control lines; first switching elements disposed in the pixels and electrically connected to the data and gate lines; a plurality of latching units disposed in the pixels to latch image information supplied from the data lines through the first switching elements; and second switching elements provided in the pixels and electrically connected to the control lines and latching units, the second switching elements supplying the image information of the latching units to the pixels when the control lines supplies the control signal.

15 Claims, 5 Drawing Sheets

LIQUID CRYSTAL DISPLAY DEVICE AND METHOD OF DRIVING THE SAME

The present invention claims the benefit of Korean Patent Application No. 2003-0094988 filed in Korea on Dec. 22, 2003, which is hereby incorporated by reference.

BACKGROUND OF THE INVENTION

1. Field of the Invention

The present invention relates to a liquid crystal display (LCD) device and a method of driving the same, and more particularly, to a field-sequential color (FSC LCD) LCD device with improved brightness and resolution and a method of driving a FSC LCD.

2. Discussion of the Related Art

In general, related art cathode ray tubes (CRT) are widely as display devices for televisions, measuring apparatuses, and information terminals. Since the related art CRTs have increased weight and size, reducing these measurements of the related art CRTs is difficult, hence, it is impossible for some electronic apparatus to be made smaller and lighter. Accordingly, demand for LCD devices which are light, small, and consume less power is rising, and the LCD devices are actively replacing the related art CRTs.

According to the driving principle of the LCDs, optical anisotropy and polarizability of liquid crystal materials are used. Since the liquid crystal materials have the shape of a round rod and has a long axis and a short axis, liquid crystal materials are arranged in a predetermined direction. By applying the electric filed to the liquid crystal materials, the direction of the liquid crystal materials is controlled. When the direction in which the liquid crystal materials are arranged is arbitrarily controlled, back-light units provided on the back surface of a LCD panel selectively transmits or selectively intercepts light in accordance with the direction of the liquid crystal materials' arrangement, so that color images can be displayed.

Figure 1:
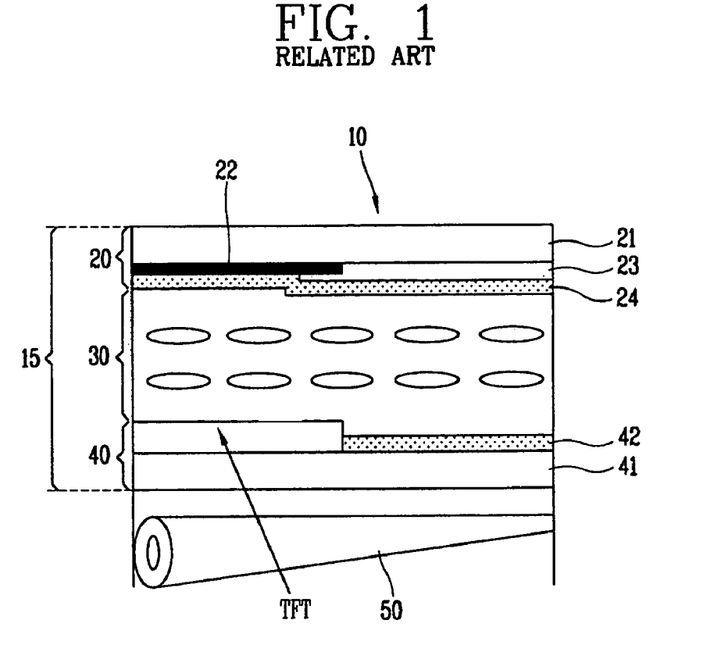
FIG. 1 is a side view of a related art LCD device.

FIG. 1 is a side view showing the structure of related art LCD device.

Referring to FIG. 1, an LCD device 10 includes a first substrate 20 and a second substrate 40 that are attached to each other having a certain cell-gap, a liquid crystal layer 30 disposed in a space between the first substrate 20 and the second substrate 40, and back-lights 50 produced on the rear surface of the second substrate 40 to supply light to a LCD panel 15.

A black matrix 22 is disposed along the outlines of pixels. The black matrix 22 partitions the pixels to a first portion that transmits light and a second portion that intercepts light. And, the black matrix 22 is disposed under a transparent substrate 21 of the first substrate 20. Red, green, and blue color filters 23 are disposed under the transparent substrate 21.

Transparent common electrodes 24 applying the electric field to the liquid crystal layer 30 are disposed under the color filters 23. On the other hand, thin film transistors (TFT), transparent pixel electrodes 42 and the transparent common electrodes 24 are disposed on a transparent substrate 41 of the first substrate 40. The TFTs function as switches. The transparent pixel electrodes 42 apply the electric field to the liquid crystal layer 30 by receiving signals from the TFTs.

In addition, a plurality of gate lines separated from each other having regular intervals and a plurality of data lines separated from each other having regular intervals intersect each other to define the pixels in the square regions. The gate lines are arranged in a horizontal direction, and the data lines are arranged in a vertical direction. The pixels are arranged on the second substrate 40 in a matrix and include the pixel electrode 42. The TFTs include gate electrodes electrically connected to the gate lines, source electrodes electrically connected to the data lines, and drain electrodes electrically connected to the pixel electrodes 42.

The related art LCD device as described above has the following disadvantages. First, it has a low transmittance of light. Only about 33% of light manages to pass through the color filters 23. Therefore, it is necessary to generate more intensive light to improve the brightness of the LCD device. As a result, power consumption increases. In addition, the color filters 23 used in the LCD device are more expensive than other materials, thus, the manufacturing cost of the LCD device increases. To solve the above-described problems, a FSC LCD device capable of realizing full colors without using the color filters 23 is suggested.

In general, when the related art LCD device is driven, the back-lights of the LCD device supplies white light in a state where the back-lights are turned on. In contrast, according to the FSC LCD device having the related art structure, a red, green and blue back-lights illuminate a pixel frame at predetermined intervals so that color images are displayed.

Figure 2:
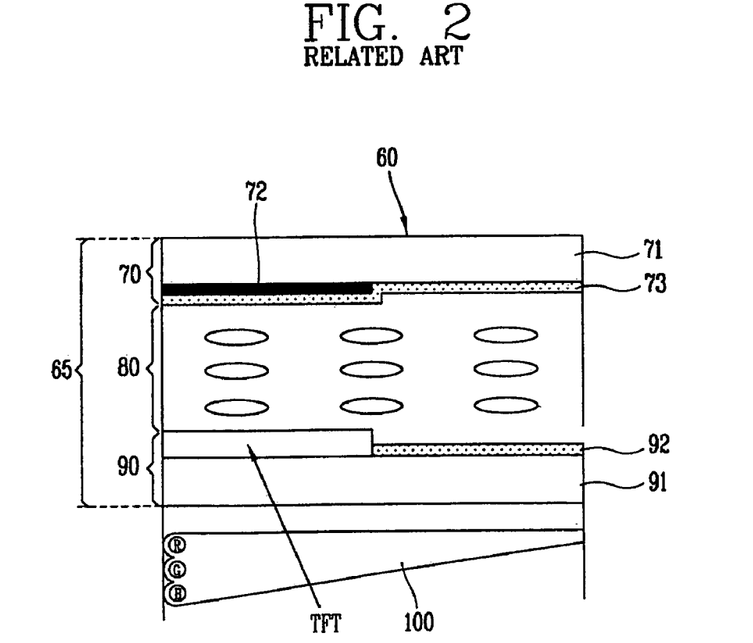
FIG. 2 is a side view of a related art FSC LCD.

FIG. 2 is a side view of the FSC LCD device having the related art structure.

Referring to FIG. 2, a FSC LCD device 60 includes a first substrate 70 and a second substrate 90 that are attached to each other having a cell gap, a liquid crystal layer 80 disposed in a space between the first substrate 70 and the second substrate 90, and a red (R), green (G), and blue (B) back-lights 100 positioned on the rear surface of the second substrate 90 to supply red, green, and blue light to a LCD panel 65.

A black matrix 72 formed along the outlines of pixels partitions the pixels into portions that transmit light and portions that intercept light. The black matrix 72 is disposed under a transparent substrate 71 of the first substrate 70. Transparent common electrodes 73 that are one-side electrodes for applying an electric field to the liquid crystal layer 80 are also disposed under the transparent substrate 71.

Thin film transistors (TFT), transparent pixel electrodes 92, and the transparent common electrodes 73 are disposed on a transparent substrate 91 of the second substrate 90, where TFTs function as switches. The transparent pixel electrode 92 applies the electric field to the liquid crystal layer 80 by receiving signals from the TFTs.

The FSC LCD device 60 having the related art structure is different from a related art LCD device in that color filters are not required, and that red, green, and blue light sources are separately turned on, for example, red (R), green (G), and blue (B) back-lights 100 are applied individually. The supplied red, green, and blue light flash 60 times per a second. However, it is visually sensed that the red, green, and blue lights are continuously emitted. For example, when the red light is first emitted and then the blue light is emitted in a short time, due to afterimage effect, it is sensed that violet light is emitted.

Figure 3:
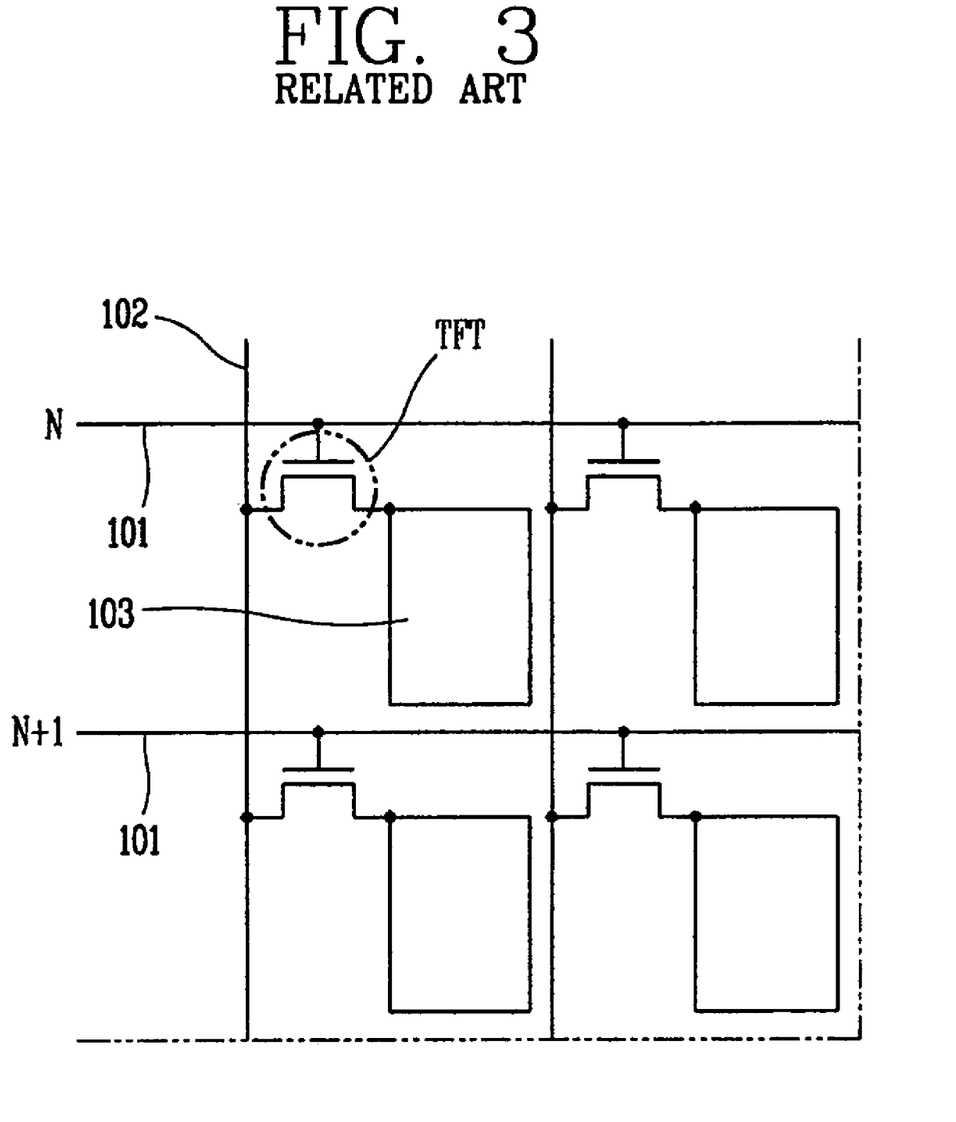
FIG. 3 is a schematic view describing the driving of the related art FSC LCD of FIG. 2.

FIG. 3 is a schematic view describing the driving of the FSC LCD device having the related art structure where TFTs are manufactured on a substrate.

Referring to FIG. 3, a plurality of horizontally arranged gate lines 101 and a plurality of vertically arranged data lines 102 intersect each other to define pixels in the square portions. Each of the TFTs is provided in one corner of each of a plurality of pixels. In addition, pixel electrodes 103 electrically connected to the TFTs are provided in the each of the plurality of pixels. The FSC LCD device having the related art structure is driven by sequentially applying a scan signal to the gate lines 101 and applying image information to the data lines 102.

As illustrated in the drawing, when a gate driving unit applies the scan signal to an Nth gate line 101, the TFTs of the pixels electrically connected to the Nth gate line 101 are simultaneously turned on and the image information supplied from the data lines 102 is applied to the pixel electrodes 103 through the turned on TFTs.

The pixel electrodes 103 are disposed on the above-described first substrate 70 of FIG. 2 to apply an electric field to the liquid crystal layer 80. The common electrodes 73 to which a common voltage is applied, is also disposed on the first substrate 70. When an electric field is applied to the liquid crystal layer 80, the direction of the liquid crystal materials arrangement in the liquid crystal layer 80 changes, and the red, green, and blue back-lights 100 are sequentially turned on. The red, green, and blue light are selectively transmitted through the liquid crystal layer 80 in accordance with the directions of the liquid crystal materials arrangement to realize color images. That is, the red, green, and blue back-lights 100 flash once on a panel in a frame during the entire driving period of the FSC LCD device having the related art structure.

According to the FSC LCD device having the related art structure, a TFT scanning period for sequentially applying the scan signal to the gate lines and for applying image information to the data lines, a liquid crystal response period for re-arranging the liquid crystal materials of the liquid crystal layer, and a flashing period for turning on the back-lights are performed with respect to the red, green, and blue back-lights. Therefore, with the driving mechanism as described above, the brightness of an image increases in a unit length of the flashing period. However, since the TFT scanning period and the liquid crystal response period must be performed three times to display one frame of an image, there is a limit to increasing the length of the flashing period. Accordingly, the brightness of the FSC LCD device having the related art structure does not have a substantial improvement as compared to the related art LCD devices where color filters are used. Furthermore, when the FSC LCD device having the related art structure has a higher resolution and an increased panel area, number of gate lines increases, and the TFT scanning period becomes longer while the liquid crystal response period is maintained. Thus, the length of the flashing period must be reduced to display one frame of the image.

As a result, for the FSC LCD device having the related art structure that has the higher resolution and the increased panel area, the length of the flashing period must be reduced. This results in a reduction of brightness, and making it difficult to display high quality images. As a result, the FSC LCD device having the related art structure is not desirable to be used in the LCD devices having the high resolution and the increased panel area.

SUMMARY OF THE INVENTION

Accordingly, the present invention is directed to a liquid crystal display device and method of driving the same that substantially obviates one or more of the problems due to limitations and disadvantages of the related art.

An object of the present invention is to provide a liquid crystal display device using a field-sequential color method (FSC LCD) with improved brightness and resolution and a method of driving the FDC LCD device.

Another object of the present invention is to provide a FSC LCD device capable of being applied to a LCD having a high resolution and an increased panel area and a method of driving the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a plurality of data lines disposed in a first direction on a substrate; a plurality of gate lines disposed in a second direction on the substrate, a plurality of pixels being defined by intersections of the gate lines and the data lines in a matrix; a plurality of control lines disposed parallel to the gate lines; a controlling unit to supply a control signal to the control lines; first switching elements disposed in the pixels and electrically connected to the data lines and the gate lines; a plurality of latching units disposed in the pixels to latch image information supplied from the data lines through the first switching elements; and second switching elements provided in the pixels and electrically connected to the control lines and the latching units, the second switching elements supplying the image information of the latching units to the pixels when the control signal is applied from the control lines.

In another aspect, the liquid crystal display device includes a controlling unit to field-divide one frame of an image into a plurality of sub-frames and to sequentially apply image information corresponding to a respective one of sub-frames to a liquid crystal display panel; a plurality of latching units disposed in the pixels of the liquid crystal display panel to latch the sequentially supplied the image information corresponding to the respective one of the sub-frames; a plurality of switching units to apply the image information latched by the latching units to the pixels when a control signal is applied from the controlling unit; and a plurality of back-lights to sequentially generate a plurality of lights in accordance with the image information of a respective one of the sub-frames when the control signal is applied from the controlling unit.

In another aspect, a method of driving a liquid crystal display device includes the steps of field-dividing one frame of an image into a plurality of sub-frames, wherein the each sub-frame includes an image information item; latching image information items provided from the each sub-frame; applying the latched image information items to the pixels of the liquid crystal display panel; and sequentially generating a plurality of lights in accordance with the image information items of the each sub-frame.

In another aspect, the method of driving a liquid crystal display device includes the steps of field-dividing one frame of image information into first to third sub-frames; sequentially applying a scan signal to gate lines of a liquid crystal display panel in the first sub-frame and supplying image information of a first color from data lines; latching the first color image information; applying the latched first color image information to the pixels of the liquid crystal display panel to re-arrange the liquid crystal material of the liquid crystal display panel; supplying light of the first color to the liquid crystal display panel; sequentially applying the scan signal to the gate lines of the liquid crystal display panel in the second sub-frame and supplying image information of a second color from the data lines; latching the second color image information; applying the latched second color image information to the pixels of the liquid crystal display panel to re-arrange the liquid crystal material of the liquid crystal display panel; supplying light of the second color to the liquid crystal display panel; sequentially applying the scan signal to the gate lines of the liquid crystal display panel in the third sub-frame and supplying image information of a third color from the data lines; latching the third color image information; applying the latched third color image information to the pixels of the liquid crystal display panel to re-arrange the liquid crystal material of the liquid crystal display panel; and supplying light of the third color to the liquid crystal display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
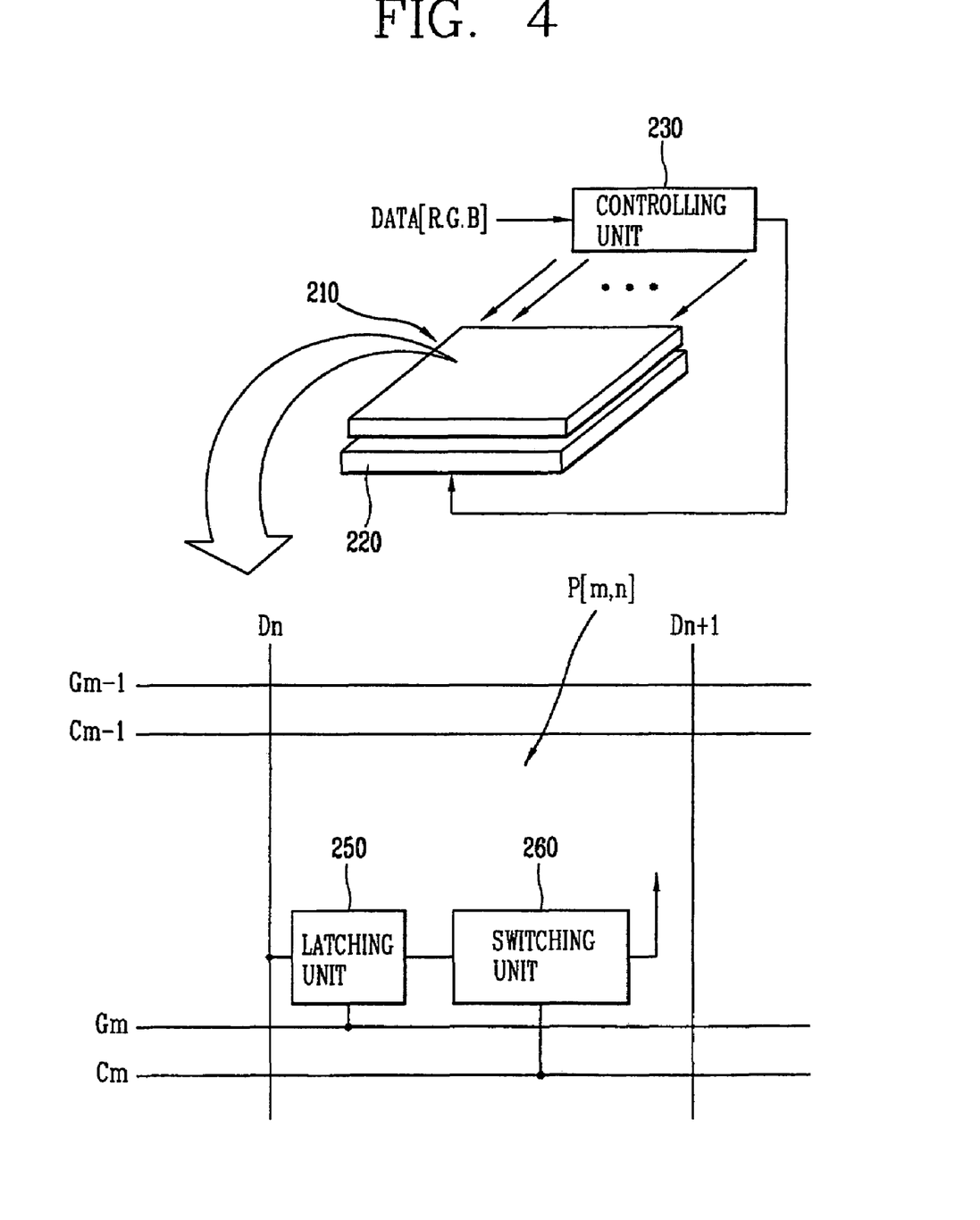
FIG. 4 is an schematic view of a FSC LCD according to an exemplary embodiment.

FIG. 4 is an exemplary view of the LCD according to an exemplary embodiment of the present invention.

Referring to FIG. 4, the LCD includes a controlling unit 230 field-dividing one frame of image information DATA[R, G,B] into first to third sub-frames SUB-FRAME1 to SUB-FRAME3. The divided image information items DATA[R], DATA[G], and DATA[B] of the first to third sub-frames SUB-FRAME1 to SUB-FRAME3 are sequentially applied to a LCD panel 210. A latching unit 250 provided in each of pixels P[m,n] of the LCD panel 210 latches the sequentially applied image information items DATA[R], DATA[G], and DATA [B]. A switching unit 260 applies the image information items DATA[R], DATA[G], and DATA[B] latched by the latching unit 250 to each of the pixels P[m,n] by a control signal provided from the controlling unit 230. Back-lights 220 are turned on in accordance with the control signal provided from the controlling unit 230 to sequentially generate red, green, and blue lights. In addition, a memory provided in each of the pixels P[m,n] of the LCD panel 210 can be used as the latching unit 250. Accordingly, the liquid crystal display panel 210 of the present invention is field-sequentially driven.

The LCD panel 210 sequentially receives the image information items DATA[R], DATA[G], and DATA[B] of the sub-frames SUB-FRAME1 to SUB-FRAME3 from the controlling unit 230 to be field-sequentially driven and may display color images in accordance with the red, green, and blue lights sequentially supplied from the back-lights 220. The LCD panel 210 includes a first substrate and a second substrate attached to each other having a predetermined cell-gap and a liquid crystal layer disposed in the cell-gap. Ferroelectric liquid crystal, optical compensated birefringent (OCB) liquid crystal, or twisted nematic (TN) liquid crystal having a high speed response characteristic can be applied to the liquid crystal layer.

A black matrix made of a material that intercepts light is disposed along the outlines of pixels in the net shape on the first substrate. In addition, common electrodes for applying an electric field to the liquid crystal layer is disposed on the first substrate. A plurality of pixels arranged in a matrix and pixel electrodes for applying an electric field to the liquid crystal layer are disposed in each pixel on the second substrate.

As described above, when the common electrodes are formed on the first substrate and the pixel electrodes are formed on the second substrate, the liquid crystal materials of the liquid crystal layer are driven by a vertical electric field generated between the common electrodes and the pixel electrodes. On the other hand, the common electrodes and the pixel electrodes may be provided on the second substrate. In such a case, the liquid crystal materials of the liquid crystal layer are driven by a horizontal electric field formed between the common electrodes and the pixel electrodes. An LCD in which pixel electrodes and common electrodes are provided on the second substrate such that the liquid crystal materials of the liquid crystal layer are driven by the horizontal electric field is referred to as an in plane switching (IPS) type LCD.

As illustrated in the partially enlarged view of FIG. 4, a plurality of vertically arranged data lines (Dn, Dn+1) and a plurality of horizontally arranged gate lines (Gm−1,Gm) partition to define the plurality of pixels P[m,n] by intersecting each other. In addition, a plurality of control lines (Cm−1, Cm) arranged in parallel with the gate lines (Gm−1,Gm) are provided on the second substrate of the LCD panel 210. Furthermore, a latching unit 250 provided in each pixel P[m, n] to latch the image information items DATA[R], DATA[G], and DATA[B] of the sub-frames SUB-FRAME1 to SUB-FRAME3. A switching unit 260 sequentially applies the image information items DATA[R], DATA[G], and DATA[B] latched by the latching unit 250 through the data lines Dn to each of the pixels P[m,n] by the control signal applied from the controlling unit 230. The switching unit 260 is provided on the second substrate of the LCD panel 210.

As described above, the LCD device of the embodiment using a field-sequential color method is different from a related art LCD device in that color filters are not required and that red, green and blue back-lights are applied to turned on each color separately.

The red, green, and blue back-lights are flashed 60 times per second by the inverter. A total of 180 flashes will result in mixing of the light of each color, red, green, and blue, to create an afterimage effect, thereby displaying color image. In the related art LCD device, when red, green and blue back-lights flash 60 times per second, the after image effect produces an error. For example, when the red light is first emitted and then the blue light is emitted in a short time, it is sensed that violet light is emitted.

According to the LCD device of the embodiment using a field-sequential color method, it is possible to prevent the deterioration of the brightness and to realize full colors using the red, green and blue back-lights. As a result, it is possible to provide a LCD panel having improved brightness, contrast, and reduced manufacturing cost. Furthermore, it is possible to effectively apply the LCD panel to an increased panel area LCD device.

The back-light 220 includes a light guide plate provided on the entire back surface of the LCD panel 210. The back-lights 220 may be provided in one side or both sides of the light guide plate. This type of back-light is referred to as a wave guide type back-light.

On the other hand, a right above type back-light includes the red, green, and blue back-lights 220 provided on the entire back surface of the LCD panel 210. A scattering plate is provided between the back-lights 220 and the LCD panel 210 such that the red, green, and blue lights are directly supplied to the entire surface of the LCD panel 210. The right above type back-light may be used as the back-lights 220. In particular, the right above type back-lights 220 are mainly applied to an LCD in which brightness is emphasized.

Figure 5:
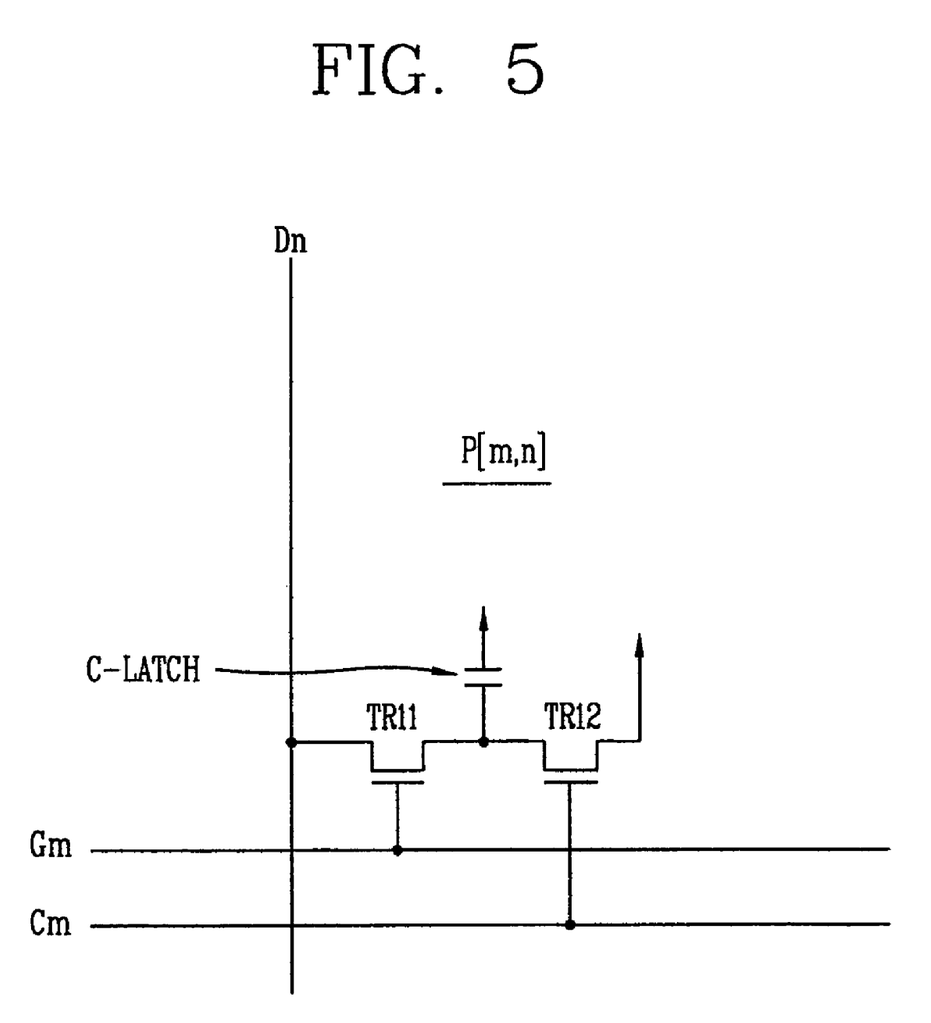
FIG. 5 is a circuit diagram of a latching unit structure and of a switching unit structure of the exemplary device of FIG. 4.

FIG. 5 illustrates the structure of the latching unit 250 and the switching unit 260 provided in the pixel P[m,n] of the LCD panel 210. The pixel P[m,n] of the LCD panel is partitioned by the horizontally arranged data line Dn and the vertically arranged gate line Gm, and the control line Cm is provided in parallel with the gate line Gm.

The pixel P[m,n] includes a first transistor TR11 electrically connected to the data line Dn and the gate line Gm, a latch capacitor C-LATCH for latching the image information supplied from the data line Dn through the first transistor TR11, and a second transistor TR12 electrically connected to the control line Cm and the latch capacitor C-LATCH to supply the image information latched by the latch capacitor C-LATCH to the pixel P[m,n]. The capacitance of the latch capacitor C-LATCH is designed to be larger than the capacitance of the liquid crystal layer. Accordingly, the voltage of the image information can be easily supplied to the pixel P[m,n].

Figure 6:
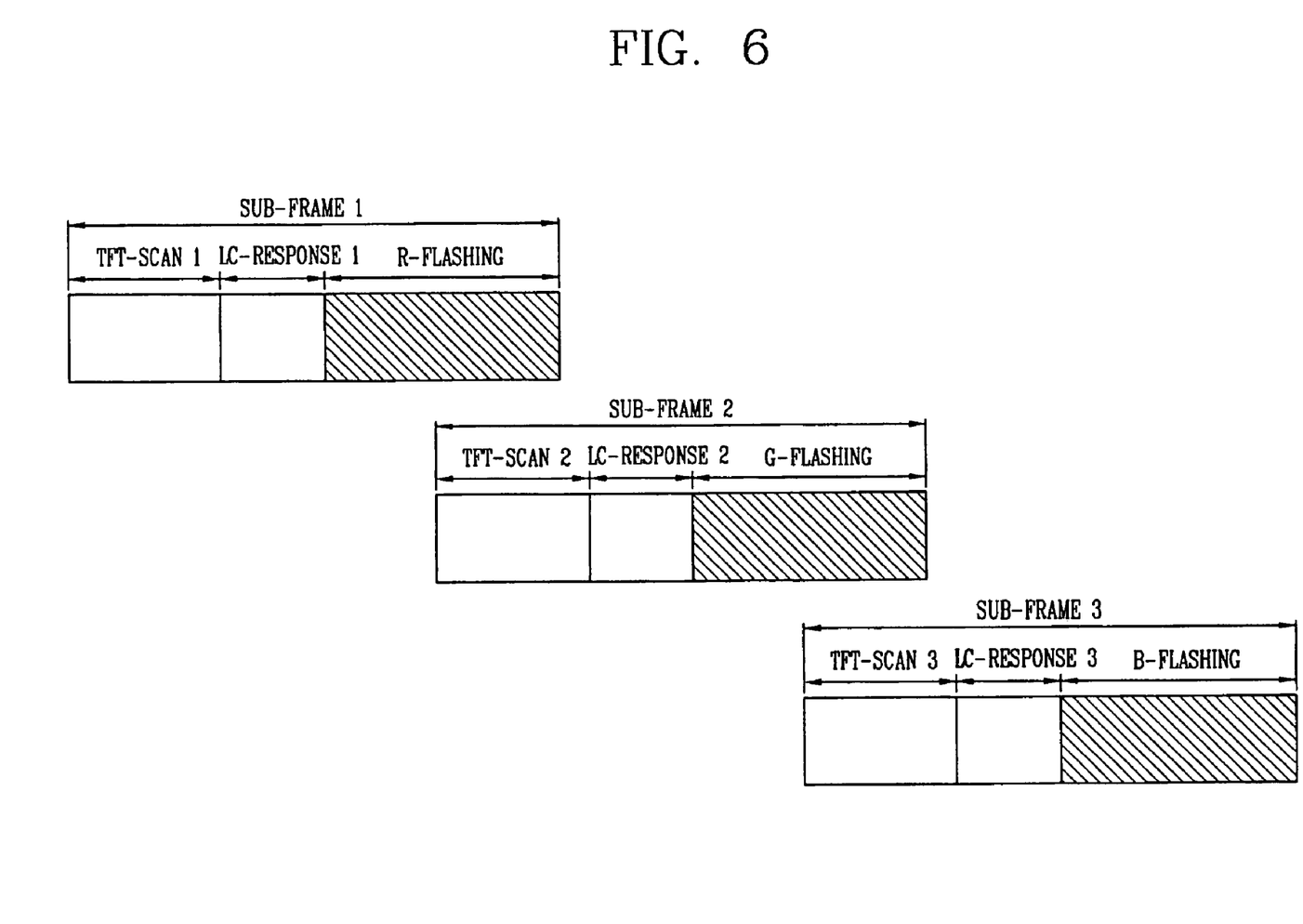
FIG. 6 is an illustration of time charts in accordance with the driving of the LCD of an exemplary embodiment.

FIG. 6 is a time chart in accordance with the driving of the LCD of the embodiment of the present invention. The driving of the LCD of the embodiment will be described in detail with reference to FIGS. 4 to 6.

First, the controlling unit 230 field-divides one frame of the image information DATA[R,G,B] into the first to third sub-frames SUB-FRAME1 to SUB-FRAME3 and sequentially applies the image information items DATA[R], DATA[G], and DATA[B] of the sub-frames SUB-FRAME1 to SUB-FRAME3 to the LCD panel 210 such that the LCD panel 210 is field-sequentially driven. For example, in the first sub-frame SUB-FRAME1, a scan signal is sequentially applied to the gate lines Gm−1 and Gm of the LCD panel 210 during the TFT scanning period TFT-SCAN1 and the red image information DATA[R] is supplied through the data lines Dn and Dn+1.

The red image information DATA[R] is latched by the latching unit 250 provided in the pixel P[m,n] of FIG. 4. At this time, as illustrated in FIG. 5, the latching unit 250 includes the first transistor TR11 having its source electrode connected to the data line Dn. The red image information DATA[R] is applied to the first transistor TR11 whose gate electrode is connected to the gate line Gm. The scan signal is applied such that the red image information DATA[R] is switched by the first transistor TRI 1 and the latch capacitor C-LATCH stores the red image information DATA[R]. When the scan signal is applied to all of the gate lines Gm−1 and Gm of the liquid crystal display panel 210 during the TFT scanning period TFT-SCAN1, the entire region of the liquid crystal display panel 210 include the red image information DATA[R] latched by the latching units 250 provided in the pixels P[m,n]. At this time, the second transistor TR12 of the switching unit 260 is intercepted by the control signal of the controlling unit 230 applied through the control line Cm.

As illustrated in FIG. 4, the red image information DATA[R] latched by the latching unit 250 is applied to the pixel P[m,n] by the switching unit 260. As illustrated in FIG. 5, the switching unit 260 includes the second transistor TR12 having its source electrode connected to the latching unit 250. The red image information DATA[R] is applied to the second transistor TR12 whose gate electrode is connected to the control line Cm. The control signal is applied such that the red image information DATA[R] is transmitted or intercepted by the second transistor TR12.

Accordingly, when the TFT scanning period TFT-SCAN1 is terminated, the control signal is applied through the control line Cm such that the red image information DATA[R] latched by the latching units 250 in the entire region of the LCD panel 210 is simultaneously applied to the respective pixels P[m,n] through the switching units 260. Since the scan signal is not applied from the gate line Gm, the first transistor TR11 of the latching unit 250 is intercepted.

The liquid crystal materials to which the red image information DATA[R] is supplied are re-arranged during the liquid crystal response period LC-RESPONSE1. When the liquid crystal materials are re-arranged during the liquid crystal response period LC-RESPONSE1, the red back-light 220 is turned on in accordance with the control signal applied from the controlling unit 230. Red color is displayed on the LCD panel 210 during a red flashing period R-FLASHING, and thereafter, the first sub-frame SUB-FRAME1 is terminated.

The second sub-frame SUB-FRAME2 starts at one point of time between the liquid crystal response period LC-RESPONSE1 of the first sub-frame SUB-FRAME1 and the red flashing period R-FLASHING. After the red image information DATA[R] latched by the latching unit 250 in the first sub-frame SUB-FRAME1 is applied to the pixel P[m,n] through the second transistor TR12 of the switching unit 260, the liquid crystal response period LC-RESPONSE1 of the first sub-frame SUB-FRAME1 starts. The driving of the LCD is not affected even when the second transistor TR12 is intercepted. Therefore, the control signal is applied through the control line Cm to intercept the second transistor TR12, and the TFT scanning period TFT-SCAN2 of the second sub-frame SUB-FRAME2 starts at one point of time between the liquid crystal response period LC-RESPONSE1 of the first sub-frame SUB-FRAME1 and the red flashing period R-FLASHING. In the TFT scanning period TFT-SCAN2 of the second sub-frame SUB-FRAME2 the scan signal is sequentially applied to the gate lines Gm−1 and Gm of the LCD panel 210 and green image information DATA[G] is supplied through the data lines Dn and Dn+1.

As described above, red image information DATA[R], the green image information DATA[G] are latched by the latching units 250 provided in the pixels P[m,n] in the entire display region of the LCD panel 210. The scan signal applied to all of the gate lines Gm-1 and Gm of the LCD panel 210 during the TFT scanning period TFT-SCAN2 achieves the latching of two image information data.

When the TFT scanning period TFT-SCAN2 is terminated, the green image information DATA[G] latched by the latching unit 250 is simultaneously applied to the pixels P[m,n] in the entire display region of the LCD panel 210. The liquid crystal materials of the LCD panel 210 to which the green image information DATA[G] is supplied are re-arranged during the liquid crystal response period LC-RESPONSE2.

When the liquid crystal materials are re-arranged during the liquid crystal response period LC-RESPONSE2, the green back-light 220 is turned on in accordance with the control signal applied from the controlling unit 230. Thereafter, the green color is displayed on the LCD panel 210 during a green flashing period G-FLASHING and that the second sub-frame SUB-FRAME2 is terminated. When the TFT scanning period TFT-SCAN2 of the second sub-frame SUB-FRAME2 is terminated, the green image information DATA[G] latched by the latching unit 250 is simultaneously applied to the pixels P[m,n] in the entire region of the image display of the LCD panel 210. Accordingly, when the TFT scanning period TFT-SCAN2 of the second sub-frame SUB-FRAME2 is terminated before the red flashing period R-FLASHING of the first sub-frame SUB-FRAME1, it is impossible to display desired color images.

That is, when the TFT scanning period TFT-SCAN2 of the second sub-frame SUB-FRAME2 is terminated while the red flashing period R-FLASHING of the first sub-frame SUB-FRAME1 and the green image information DATA[G] is simultaneously applied to the pixels P[m,n] in the entire display region of the LCD panel 210, the liquid crystal layer is driven by the green image information DATA[G] while the liquid crystal layer is driven by the voltage value of the red image information DATA[R] such that red color is displayed on the LCD panel 210. Therefore, it is impossible to display red having desired brightness by the LCD panel 210.

Considering the above-described problem, the TFT scanning period TFT-SCAN2 of the second sub-frame SUB-FRAMME2 must be terminated either at the time or after the time when the red flashing period R-FLASHING of the first sub-frame SUB-FRAME1 is terminated. Similarly, the third sub-frame SUB-FRAME3 starts at one point of time between the liquid crystal response period LC-RESPONSE2 of the second sub-frame SUB-FRAAME2 and the green flashing period G-FLASHING. After the green image information DATA[G] latched by the latching unit 250 in the second sub-frame SUB-FRAME2 is applied to the pixel P[m,n] through the switching unit 260, the liquid crystal response period LC-RESPONSE2 of the second sub-frame SUB-FRAME2 starts. The driving of the LCD is not affected even when the second transistor TR12 is intercepted. Accordingly, the control signal is applied through the control line Cm to intercept the second transistor TR12 such that the TFT scanning period TFT-SCAN3 of the third sub-frame SUB-FRAME3 starts at one point of time between the liquid crystal response period LC-RESPONSE2 of the second sub-frame SUB-FRAME2 and the green flashing period G-FLASHING.

Similarly, the third sub-frame SUB-FRAME3 the scan signal is sequentially applied to the gate lines Gm−1 and Gm of the liquid crystal display panel 210 and blue image information DATA[B] is supplied to the latching unit 250 through the data lines Dn and Dn+1. The blue image information DATA[B] is latched by the latching units 250 during the TFT scanning period TFT-SCAN3. Accordingly, the blue image information DATA[B] is charged by the latch capacitor C-LATCH provided in the latching unit 250.

When the TFT scanning period TFT-SCAN3 is terminated, blue image information DATA[B] latched by the latching unit 250 is simultaneously applied to the pixels P[m,n] in the entire region of the liquid crystal display panel 210. In accordance with the scan signal which is sequentially applied to the gate lines Gm−1 and Gm during the TFT scanning period TFT-SCAN3, the blue image information DATA[B] stored in the latching units 250 simultaneously output by the switching units 260 in the entire region of the image display. In the liquid crystal response period LC-RESPONSE3, the blue image information DATA[B] is received through the switching unit 260 and the arrangement of the liquid crystal materials of the pixels P[m,n] of the entire region of the image display changes. The liquid crystal materials of the LCD panel 210 to which the blue image information DATA[B] is supplied are re-arranged during the liquid crystal response period LC-RESPONSE3.

When the liquid crystal materials are re-arranged during the liquid crystal response period LC-RESPONSE3, the blue back-light 220 is turned on in accordance with the control signal applied from the controlling unit 230. The blue color is displayed on the LCD panel 210 during a blue flashing period B-FLASHING. Thereafter, the third sub-frame SUB-FRAME3 is terminated.

As described above, when the TFT scanning period TFT-SCAN3 of the third sub-frame SUB-FRAME3 is terminated, the blue image information DATA[B] latched by the latching unit 250 is simultaneously applied to the pixels P[m,n] in the entire display region of the LCD panel 210. Thus, when the TFT scanning period TFT-SCAN3 of the third sub-frame SUB-FRAME3 is terminated before the green flashing period R-FLASHING of the second sub-frame SUB-FRAME2, it is impossible to display desired color images.

When the TFT scanning period TFT-SCAN3 of the third sub-frame SUB-FRAME3 is terminated while the green flashing period G-FLASHING of the second sub-frame SUB-FRAME2 and the blue image information DATA[B] is simultaneously applied to the pixels P[m,n] in the entire display region of the LCD panel 210, the liquid crystal layer is driven by the blue image information DATA[B] while the liquid crystal layer is driven by the voltage value of the green image information DATA[G] such that green is displayed by the LCD panel 210. Accordingly, it is not possible to display green having desired brightness by the LCD panel 210, and thus, the desired color images can not be displayed.

Considering the above-described problem, the TFT scanning period TFT-SCAN3 of the third sub-frame SUB-FRAMME3 must be terminated either at the time or after the time when the green flashing period G-FLASHING of the second sub-frame SUB-FRAME2 is terminated.

As described above, according to the LCD device of the embodiment using a field-sequential color method and the method of driving the field-sequential LCD device, the TFT scanning period of a trailing sub-frame starts at one point of time between the liquid crystal response period and the flashing period of a preceding sub-frame such that delay time caused by the TFT scanning period is removed or minimized in the LCD device using a field-sequential color method.

Accordingly, the flashing period of the LCD device of the present invention is secured using a field-sequential color method. An amount of the TFT scanning period is reduced and substantially improves the brightness of the FSC LCD device as compared to the related art LCD device using color filters.

Although the FSC LCD is applied to a high resolution and an increased panel area product having increased number of gate lines, it is possible to remove or minimize the delay time caused by the TFT scanning period. Therefore, the flashing period of the FSC LCD applied to the high resolution or the increased panel area product is secured and deterioration of the brightness is prevented. Accordingly, the FSC LCD device of the present invention can be applied to the high resolution and the increased panel area products having the adequate brightness.

It will be apparent to those skilled in art that various modifications and variations can be made in the liquid crystal display device and method of driving the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a plurality of data lines disposed in a first direction on a substrate;
a plurality of gate lines disposed in a second direction on the substrate, a plurality of pixels being defined by intersections of the gate lines and the data lines in a matrix;
a plurality of control lines disposed parallel to the gate lines;
a controlling unit to supply a control signal to the control lines;
first switching elements disposed in the pixels and electrically connected to the data lines and the gate lines;
a plurality of latching units disposed in the pixels to latch image information supplied from the data lines through the first switching elements, the image information having first to third sub-frames; and
second switching elements provided in the pixels and electrically connected to the control lines and the latching units, the second switching elements supplying the image information of the latching units to the pixels when the control signal is applied from the control lines,
wherein the latched image information corresponding one sub-frame is applied to the pixel through the second switching element before the previous sub-frame is terminated.

2. The liquid crystal display device according to claim 1, wherein the first switching elements include transistors whose source electrodes are connected to the data lines, whose gate electrodes are connected to the gate lines, and whose drain electrodes are connected to the latching units.

3. The liquid crystal display device according to claim 1, wherein the second switching elements include transistors whose source electrodes are connected to the latching units, whose gate electrodes are connected to the control lines, and whose drain electrodes are connected to the pixels.

4. The liquid crystal display device according to claim 1, wherein the latching units include capacitors connected to the drain electrodes of the first switching elements and to the source electrodes of the second switching elements, wherein the image information supplied through the first switching elements are charged in the latching units.

5. The liquid crystal display device according to claim 4, wherein the capacitance of the capacitors is larger than the capacitance of a liquid crystal layer.

6. The liquid crystal display device according to claim 1, wherein the latching units include digital memory cells.

7. A liquid crystal display device, comprising:
a controlling unit to field-divide one frame of an image into a plurality of sub-frames and to sequentially apply image information corresponding to a respective one of sub-frames to a liquid crystal display panel;
a plurality of latching units disposed in the pixels of the liquid crystal display panel to latch the sequentially supplied the image information corresponding to the respective one of the sub-frames;
a plurality of switching units to apply the image information latched by the latching units to the pixels when a control signal is applied from the controlling unit; and
a plurality of back-lights to sequentially generate a plurality of lights in accordance with the image information of a respective one of the sub-frames when the control signal is applied from the controlling unit,
wherein the latched image information corresponding one sub-frame is applied to the pixel before the previous sub-frame is terminated.

8. The liquid crystal display device according to claim 7, wherein the plurality of back-lights include red, green, and blue back-lights.

9. A method of driving a liquid crystal display device, comprising the steps of:
field-dividing one frame of an image into a plurality of sub-frames, wherein the each sub-frame includes an image information item;
latching image information items provided from the each sub-frame;
applying the latched image information items to the pixels of the liquid crystal display panel; and
sequentially generating a plurality of lights in accordance with the image information items of the each sub-frame,
wherein the latched image information items corresponding one sub-frame is applied to the pixel before the previous sub-frame is terminated.

10. A method of driving a liquid crystal display device, comprising the steps of:
field-dividing one frame of image information into first to third sub-frames;
sequentially applying a scan signal to gate lines of a liquid crystal display panel in the first sub-frame and supplying image information of a first color from data lines;
latching the first color image information;
applying the latched first color image information to the pixels of the liquid crystal display panel to re-arrange the liquid crystal material of the liquid crystal display panel;
supplying light of the first color to the liquid crystal display panel;
sequentially applying the scan signal to the gate lines of the liquid crystal display panel in the second sub-frame and supplying image information of a second color from the data lines;
latching the second color image information;
applying the latched second color image information to the pixels of the liquid crystal display panel to re-arrange the liquid crystal material of the liquid crystal display panel;
supplying light of the second color to the liquid crystal display panel;
sequentially applying the scan signal to the gate lines of the liquid crystal display panel in the third sub-frame and supplying image information of a third color from the data lines;
latching the third color image information;
applying the latched third color image information to the pixels of the liquid crystal display panel to re-arrange the liquid crystal material of the liquid crystal display panel; and
supplying light of the third color to the liquid crystal display panel.

11. The liquid crystal display device according to claim 10, wherein in the first to third sub-frames, a trailing sub-frame starts at one point of time between a period when the liquid crystal material of the liquid crystal display panel are re-arranged and a period when lights are supplied to the liquid crystal display panel outputting light of preceding sub-frame.

12. The method according to claim 10, wherein in the first to third sub-frames, application of scan signal to the gate lines acquiring the image information of trailing sub-frame and outputting the instant image information to the data lines in sequence is terminated at some point of time before preceding sub-frame initiates application of scan signal to the gate lines.

13. The method according to claim 10, wherein in the first to third sub-frames, application of scan signal to the gate lines acquiring the image information of preceding sub-frame and outputting the instant image information to the data lines in sequence is terminated at some point of time after outputting of light based on the image information from the trailing sub-frame is finished.

14. The method according to claim 10, wherein the first, second and third colors are different ones of red, green, and blue.

15. The method according to claim 10, wherein the first, second and third colors are respectively, red, green, and blue.

* * * * *